United States Patent [19]
Karpinski

[11] Patent Number: 5,341,209
[45] Date of Patent: Aug. 23, 1994

[54] TRIANGULAR DITHER DRIVE APPARATUS FOR A RING LASER GYROSCOPE

[75] Inventor: Andrew J. Karpinski, Clearwater, Fla.

[73] Assignee: Honeywell Inc., Minneapolis, Minn.

[21] Appl. No.: 954,082

[22] Filed: Sep. 30, 1992

[51] Int. Cl.[5] .............................. G01C 19/66
[52] U.S. Cl. ............................................ 356/350
[58] Field of Search ........................................ 356/350

[56] References Cited

U.S. PATENT DOCUMENTS

| | | | |
|---|---|---|---|
| 3,373,650 | 3/1968 | Killpatrick | 356/350 |
| 3,467,472 | 9/1969 | Killpatrick | 356/350 |
| 4,152,071 | 5/1979 | Podgorski | 356/350 |
| 4,445,779 | 5/1984 | Johnson | 356/350 |
| 4,790,658 | 12/1988 | Sewell | 356/350 |
| 4,826,320 | 5/1989 | Callaghan et al. | 356/350 |
| 4,898,469 | 2/1990 | Sewell et al. | 356/350 |
| 4,988,908 | 1/1991 | Langton | 356/350 |
| 5,094,537 | 3/1992 | Karpinski, Jr. | 356/350 |

*Primary Examiner*—Vincent P. McGraw

[57] ABSTRACT

Control apparatus for an RLG dither motor includes a digital phase shifter for providing a clock signal related to the RLG position signal. A rate pulse generator for receiving an amplitude word signal generated by a processor at intervals determined by the clock signal and providing a pulse rate signal related to the amplitude word signal. The pulse rate signal is combined with the RLG position signal to provide a second pulse rate signal which is integrated to provide a triangular dither drive signal.

14 Claims, 2 Drawing Sheets

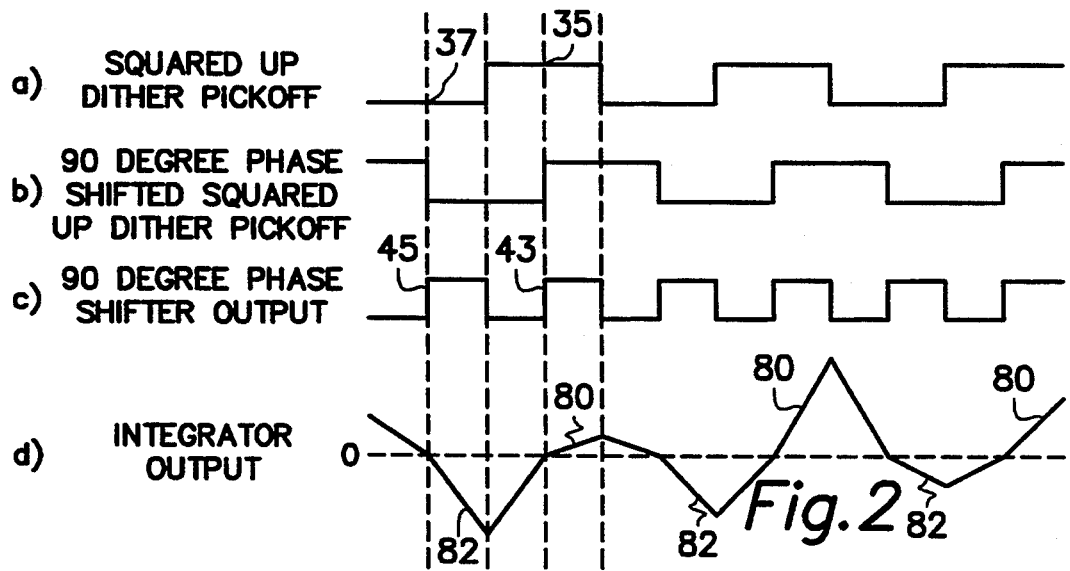
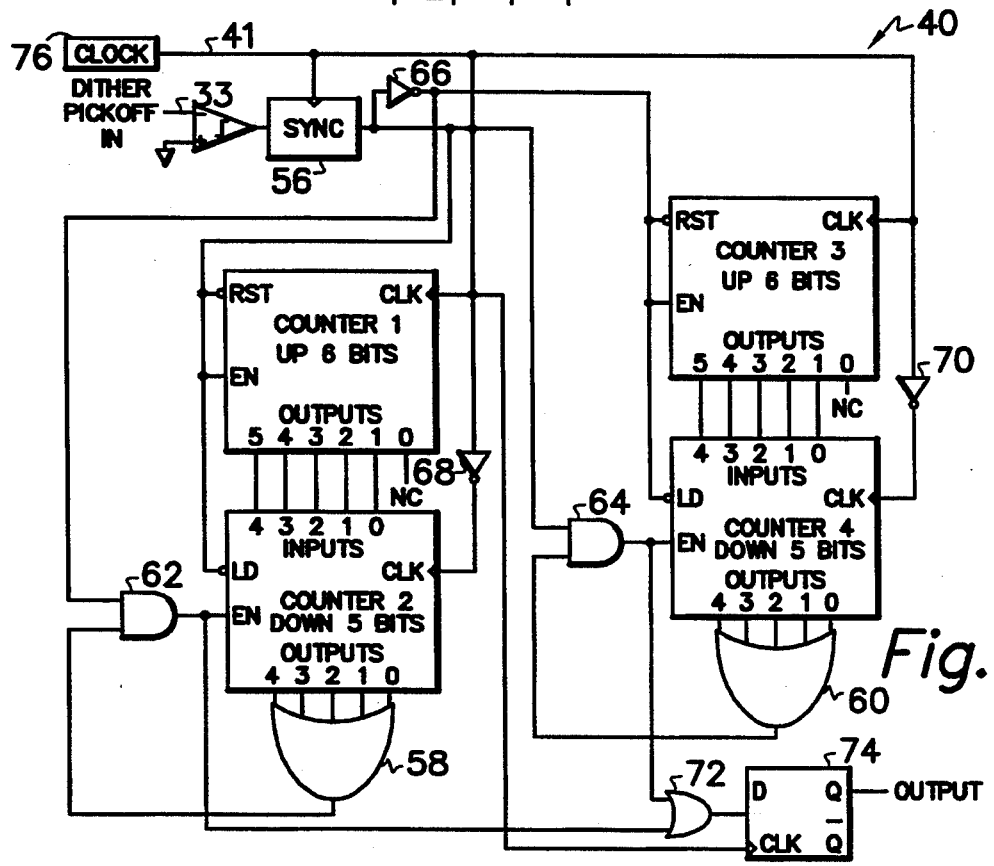

TRIANGULAR DITHER DRIVE APPARATUS FOR A RING LASER GYROSCOPE

BACKGROUND OF THE INVENTION

The present invention relates generally to ring laser gyroscopes (RLG's) more specifically to the dithering system for such gyroscopes and most specifically to the control of the dithering system.

A bothersome characteristic of ring laser gyros is "lock-in" at rotation input rates below a certain value. The principle of using dither to reduce or eliminate the effects of lock-in is disclosed in U.S. Pat. No. 3,373,650, to Joseph E. Killpatrick, entitled "Laser Angular Rate Sensor" and assigned to the same assignee as the present application.

Dither drive electronics have the function of dithering the RLG and controlling the amplitude of the drive signal to the dither drive motor. The control of the amplitude involves sensing, typically by means of a dither pick-off, the amplitude of the dither pick-off signal and making necessary adjustments in the drive to maintain the required pick-off signal. Various types of dither drive signals and various approaches to the control of the dither drive signal may be used. For example, pulse width modulation where most of the hardware is implemented with digital electronics and the drive signal is a pulse of varying width. Another approach would be to utilize a sinusoidal dither drive signal and analog control loops.

SUMMARY OF THE INVENTION

The output of a dither pick-off which is proportional to RLG angular portion with respect to the RLG mounting surface is referred to as dither position. Thus dither pick-off is sent to an A/D converter. A processor reads the A/D converter and writes a new amplitude control word to a register in the dither logic. The dither pick-off is also squared up and sent to a 90 degree phase shifter. The phase shifter output is a square wave signal twice the dither frequency with rising edges that roughly correspond with zero rate crossings of the dither pick-off signal. At each rising edge of the phase shifter output signal, the amplitude word is clocked into another register which feeds a programmable pulse rate generator. This results in the rate of the programmable pulse rate generator changing with each zero rate crossing of the dither pick-off signal. The output of the programmable rate pulse generator is gated to an integrator according to the state of the squared up dither pick-off. Therefore if the squared up dither pick-off is high, the output pulses are gated so as to cause the integrator to ramp up. If the squared up dither pick-off is low, the output pulses are gated to cause the integrator to ramp down. The output of the integrator drives the dither motor on the RLG.

BRIEF DESCRIPTION OF THE DRAWINGS

FIG. 2 illustrates the relationship of various signals for the block diagram of FIG. 1.

FIG. 3 is a schematic diagram further detailing a portion of the block diagram of FIG. 1.

DESCRIPTION OF THE PREFERRED EMBODIMENT

Figure 1:
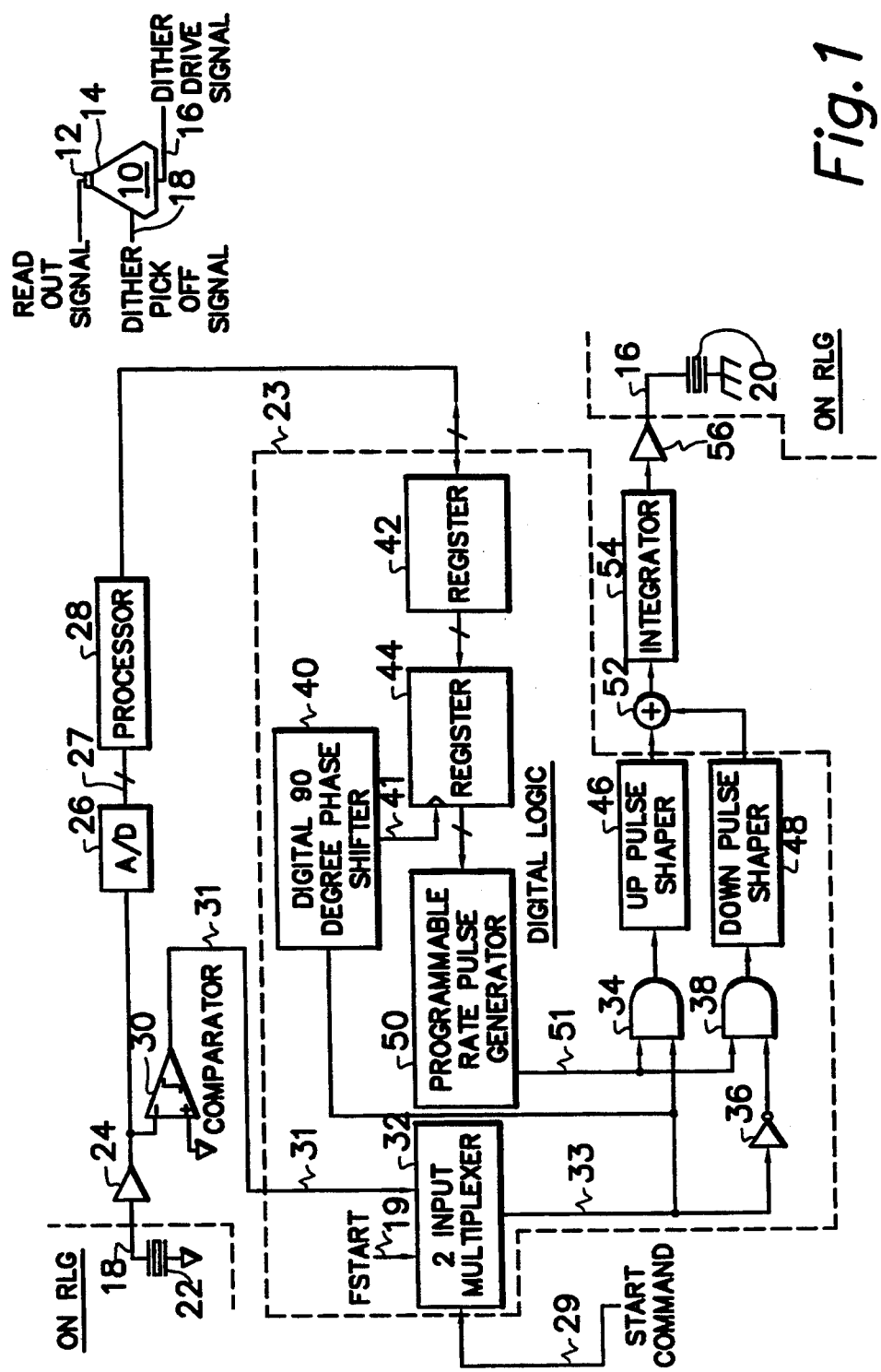
FIG. 1 is a schematic block diagram illustrating a triangular dither control apparatus in accordance with the present invention.

FIG. 1 shows a ring laser gyro or ring laser angular rate sensor 10 including a readout mechanism 12 mounted to block 14. Block 14 provides the propagation path for counter rotating laser beams. Sensor 10 is also provided with a dither drive signal 16 and a dither pick-off signal 18.

Shown in FIG. 1 is a dither motor 20 which is a piezoelectric device attached to a resilient means such as a spring (not shown). Whereby an application of an appropriate voltage to motor 20 will cause flexing of the spring and produce dither motion. Dither pick-off 22 which is also shown as a piezoelectric device attached to the spring acts as a rotation sensing means and will provide an output signal indicative of the torsional stress caused by the flexing of the spring due to dither motor 20. This output signal when properly loaded is proportional to angular position and can be referred to as an angular position signal or angular sensor position signal.

Output signal 18 of dither pick-off 22 is buffered by buffer amplifier 24 and sent to analog/digital (A/D) converter 26. The digital output signal 27 of A/D converter 26 is read by processor 28. The output of buffer amplifier 24 is also sent to comparator 30 where it is squared up. The output of processor 28 and the squared up dither pick-off signal are inputs to digital logic means 23. This squared up dither pick-off signal 31 is one input to multiplexer 32. The other input to multiplexer 32 is a starting frequency signal 19. Multiplexer 32 is controlled by start command 29. The output 33 of multiplexer 32 is connected to phase shifter 40 which is a digital 90 degree phase shifter which provides a square wave signal that is twice the frequency of its input signal. This square wave signal provides a rising edge approximately mid-point between each transition of the squared up dither pick-off. The operation of phase shifter 40 will be explained hereinafter.

The output 33 of multiplexer 32 also goes to one input of two input AND gate 34 and to the input of inverter 36. Output of inverter 36 is one input to two input AND gate 38.

Processor 28 reads the output of A/D converter 26, calculates a desired amplitude for the next drive signal, and writes an amplitude word representing the new dither drive signal amplitude to register 42. This amplitude word may be written at any time, asynchronous to the dither cycle. The data in this amplitude word includes any noise modulation of the amplitude of the dither drive signal. The output of phase shifter 40 is a signal at twice the frequency of the dither pick-off signal and that has been shifted in phase 90 degrees with respect to the dither pick-off signal. This results in signal 41 having a rising edge for each dither zero rate crossing. At each rising edge of the phase shifter 40 output signal 41, the amplitude word is clocked into register 44 from register 42. Register 44 feeds programmable rate pulse generator 50 which generates output pulses at a rate proportional to the amplitude word written into it. This results in the rate of pulse generator 50 changing with each zero crossing of dither rate. Output 51 of pulse generator 50 is input to AND gate 34 and AND gate 38. The output of AND gate 34 feeds up pulse shaper 46. The output of AND gate 38 feeds down pulse shaper 48. Up pulse shaper 46 and down pulse shaper 48 each generate an output pulse of well defined total energy, i.e., defined voltage and defined time, for each input pulse. The output of up pulse shaper 46 and the output of down pulse shaper 48 feed summer 52. The output of summer 52 is connected to integrator 54. Integrator 54 is connected to buffer 56. The output of buffer 56 is dither drive signal 16 which is connected to dither motor 20.

Squared up dither pick-off signal 31 or squared up dither position signal is shown in FIG. 2. Also shown in FIG. 2 is the output of phase shifter 40 which is twice the frequency of the dither pick-off signal and is shifted 90 degrees with respect to the squared up dither pick-off signal. A zero dither rate condition will exist at approximately the mid-point 35 of the positive portion and the mid-point 37 negative portion of the squared up dither position signal. As shown in FIG. 2 the output of phase shifter 40 provides a rising edge 43 that approximately corresponds to the zero dither rate condition. In FIG. 2 rising edge 43 is concurrent with mid-point 35 and rising edge 45 is concurrent with mid-point 37.

The operation of phase shifter 40 as shown in FIG. 3 will now be explained. The output of multiplexer 40 which is the squared up dither pick-off is the input to synchronizer 56. Phase shifter 40 provides a clock signal 41 to synchronize the output of synchronizer 56. Counter 1 is an "up" counter having a clock input, enable input and reset input. Counter 1 has outputs 0–5. Counter 2 is a down counter having a clock input, enable input, and load input. Counter 2 has inputs 0–4 and outputs 0–4. Outputs 0–4 are input to OR gate 58. Counter 3 is an "up" counter having a clock input, enable input and reset input. Counter 3 has outputs 0–5. Counter 4 is a down counter having a clock input, enable input, and load input. Counter 4 has inputs 0–4 and outputs 0–4. Outputs 0–4 are input to or gate 60. Phase shifter 40 includes AND gates 62 and 64, inverters 66, 68 and 70. It further includes 2 input OR gate 72, output flip-flop 74 and clock 76.

In the operation of phase shifter 40, the synchronized dither pick-off signal enables counter 1 to begin counting clock cycles of phase shifter clock 76. Counter 1 counts the number of clock cycles within half a dither cycle, which is effectively the period of the half dither cycle. At the end of the half dither cycle, all but the least significant bit of counter 1 is loaded into counter 2, effectively dividing the dither period by 2. Counter 2 is then counted down from the start of the next half dither cycle. Counter 2 should reach zero about half way through this next half dither cycle, which is approximately 90 degrees into the cycle. When counter 2 reaches zero, it generates a rising edge which is shown feeding the enable input of counter 2 and an input of OR gate 72. Counters 3 and 4 operate the same as counters 1 and 2, but for the alternating half dither cycles. The rising edges generated when counters 2 and 4 reach zero are input to OR gate 72 and the output of flip-flop 74 is the output of phase shifter 40.

Six bits should be sufficient for counters 1 and 3, with five bits sufficient for counters 2 and 4. If we assume an RLG with a dither frequency of 650 Hz and a phase shifter clock of 62.5 KHz, the worst case error would be about +1.5 counts and −0.5 counts. This corresponds to a phase shift of 90 degrees +5.6/−1.9 degrees. This is more than adequate for closing the dither amplitude control loop. Where greater or less accuracy in the phase shift is needed, the bits per counter may be changed as well as the clock frequency.

The resulting dither drive signal is illustrated in FIG. 2.d. as a triangular dither drive signal. Processor 28 controls the amplitude of this drive signal. The amplitude of the triangular drive signal changes for each zero crossing of the drive signal, i.e., if squared up dither pick-off signal 31 is high, then output 51 of pulse generator 50 is gated so as to cause integrator 54 to ramp up as shown at 80 in FIG. 2.d. If dither pick-off signal 31 is low, then output 51 of pulse generator 50 is gated so as to cause integrator 54 to ramp up as shown at 82 in FIG. 2.d.

The triangular dither drive of the present invention has the advantage of requiring significantly less drive power than pulse width modulation dither. Also the triangular drive should generate less noise and cross talk than pulse width modulation due to the relatively gradual transitions of the triangular waveform.

In accordance with the foregoing description, Applicant has developed a control apparatus for providing a triangular dither drive for an RLG. Although a specific embodiment of Applicant's invention is shown and described for illustration purposes, a number of variations will be Applicant to those of ordinary skill in the relevant arts. It is not intended that coverage be limited to the disclosed embodiment, but only by the terms of the following claims.

I claim:

1. Control apparatus for a dither motor, said dither motor for oscillating a ring laser angular rate sensor suspended from a support, wherein the oscillations of the sensor have controlled clockwise and counterclockwise amplitudes of rotation in response to an amplitude control signal, said ring laser gyro having a transducer for providing an angular position signal, said control apparatus comprising:

first signal means for receiving said angular position signal and for producing an amplitude word signal;

second signal means for providing a clock signal having a pulse edge concurrent with a zero rate condition of said angular position signal;

third signal means for converting said amplitude word signal to a pulse rate signal with said pulse rate related to said amplitude word signal and said pulse rate changing with each said clock signal;

fourth signal means for combining said angular position signal with said pulse rate signal to produce pulses in a first direction when said angular position signal is high and pulses in a second direction when said angular rate position signal is low;

fifth signal means to receive said pulses in said first and second directions and integrate said pulses to provide a triangular wave amplitude control signal responsive to said amplitude word signal for driving said dither motor.

2. Control apparatus of claim 1 wherein said first signal means comprises analog to digital converter means and processor means.

3. Control apparatus of claim 2 wherein said second signal means comprises phase shifter means for providing a clock signal related to said angular position signal and displaced from said angular position signal by a predetermined phase amount.

4. Control apparatus of claim 3 wherein said clock signal is at twice the frequency of said angular position signal and is displaced in phase approximately 90 degrees.

5. Control apparatus of claim 1 wherein said third signal means comprises at least one register and a programmable rate pulse generator.

6. Control apparatus of claim 4 wherein said fourth signal apparatus comprises gating means.

7. Control apparatus of claim 6 wherein said fifth signal means comprises an up pulse shaper and a down pulse shaper.

8. Control apparatus for a dither motor, said dither motor for oscillating, at a first frequency, a ring laser angular rate sensor suspended from a support, wherein the oscillations of the sensor have controlled clockwise and counterclockwise amplitudes of rotation in response to an amplitude control signal, said ring laser gyro having a transducer for providing a signal representative of said angular position, said control apparatus comprising:
 conversion means for receiving said signal representative of said angular position and providing an amplitude word signal;
 means for shaping said first signal representative of said angular position to a first square wave angular position signal;
 means for providing a second signal related to said first square wave angular position signal in frequency and displaced from said first square wave angular position signal by a predetermined phase amount;
 rate pulse generator means for receiving said amplitude word signal at times as determined by said second signal and for providing a first pulse rate signal with said first pulse rate related to said amplitude word signal;
 combining means for combining said first square wave angular position signal with said first pulse rate signal to produce pulses in a first direction when said signal representative of said angular position is high and pulses in a second direction when said signal representative of said angular position signal is low;
 integration means to receive said pulses and integrate said pulses to provide a substantially triangular wave amplitude control signal responsive to said amplitude word signal for driving said dither motor.

9. Control apparatus of claim 8 wherein said first square wave sensor position signal has a high portion having a mid-point and a low portion having a mid-point and said mid-points correspond approximately to a zero dither rate condition, and wherein said second signal has a rising edge approximately at said midpoints.

10. Control apparatus of claim 9 wherein said second signal is twice said first frequency and said predetermined phase amount is 90 degrees.

11. Control apparatus of claim 8 wherein said amplitude control signal ramps up when said first square wave angular position signal is high and ramps down when said first square wave angular position signal is low;

12. Control apparatus of claim 10 wherein said amplitude control signal ramps up when said first square wave angular position signal is high and ramps down when said first square wave angular position signal is low;

13. Control apparatus for an RLG dither motor, said dither motor for oscillating a ring laser angular rate sensor suspended from a support, wherein the oscillations of the sensor have controlled clockwise and counterclockwise amplitudes of rotation in response to an amplitude control signal, said ring laser gyro having a transducer for providing an angular sensor position signal, said control apparatus comprising:
 first signal means for receiving said angular sensor position signal, for producing an amplitude word signal;
 phase shifter means for providing a clock signal related to said angular sensor position signal and displaced from said angular sensor position signal by a predetermined phase amount;
 rate pulse generator means for receiving said amplitude word signal as determined by said clock signal and providing a first pulse rate signal related to said amplitude word signal;
 means for combining said pulse rate signal and said angular sensor position signal and providing a second pulse rate signal responsive to said amplitude word signal; and
 integration means for receiving said second pulse rate signal and providing a substantially triangular wave signal amplitude control signal to drive said dither motor.

14. Control apparatus of claim 13 wherein said amplitude control signal is a substantially triangular wave signal has zero cross over points concurrent with said clock signal transition in a first direction.

* * * * *